Aug. 27, 1968 E. BIERMAN ET AL 3,399,279
NUMBER TRANSLATOR
Filed March 17, 1965 6 Sheets-Sheet 1

INVENTORS
E. BIERMAN
R. GAGNIER
R. KENEDI
AGENT
Curphey & Erickson

Aug. 27, 1968 E. BIERMAN ET AL 3,399,279

NUMBER TRANSLATOR

Filed March 17, 1965 6 Sheets-Sheet 2

INVENTORS
E. BIERMAN
R. GAGNIER
R. KENEDI

AGENT

Curphey & Erickson

INVENTORS
E. BIERMAN
R. GAGNIER
R. KENEDI
AGENT
Curphey & Erickson

INVENTORS
E. BIERMAN
R. GAGNIER
R. KENEDI

AGENT
Murphey & Erickson

INVENTORS

E. BIERMAN

R. GAGNIER

R. KENEDI

AGENT

Curphey & Erickson

INVENTORS
E. BIERMAN
R. GAGNIER
R. KENEDI
AGENT
Cushey & Erickson

United States Patent Office 3,399,279

Patented Aug. 27, 1968

3,399,279

NUMBER TRANSLATOR

Eric Bierman, Ottawa, Ontario, Real Gagnier, Hull, Quebec, and Robert Kenedi, Ottawa, Ontario, Canada, assignors to Northern Electric Company Limited, Montreal, Quebec, Canada Filed Mar. 17, 1965, Ser. No. 440,526
9 Claims. (Cl. 179—18)

This invention relates to a number translator to convert a directory number into a line location and a ringing code. Such a number translator is used in a switching system of the common control type.

In a common control switching system, more particularly one employing crossbar switches, each station is assigned a unique directory number which is fed into the system to call and establish communication with that station. One or more stations are associated with an output of the system, termed a line location, which is controlled by operation of a crossbar switch hold magnet. Due to traffic loading requirements of the system, it may be necessary to re-associate a station with a different line location: at the same time, it is necessary to retain the same directory number so that the subscriber's callers do not require to be advised of a new number. A number translator is employed to translate the directory number of the called station to the line location associated with that station and to select the proper ringing code for that station. Prior to our invention, number translators employed a relay tree or a crossbar switch to electrically mark either a single lead, or a group of leads, representing the directory number; the marked leads were connected with jumpers to means for producing a plurality of individual marked leads required to locate the called line location and select the ringing code. These means required special coils, gas tubes or large arrays of resistors. Our invention accomplishes the same end at reduced cost using standard relays in place of special expensive components.

The prior art is well represented by the patent of Vroom, U.S. Patent 2,675,426. This patent discloses a number translator using a crossbar switch. The hundreds and tens digits are used to operate the select and hold magnets respectively of the switch and so operate a crosspoint to extend ten leads, one of which is marked to represent the units digit. A jumper wire is connected to this marked lead and threaded through a plurality of coils where it acts as a single turn primary winding for each coil. The electrical mark on the jumper causes an output from each coil, so threaded by the jumper, each output firing a cold cathode gas tube, thus producing several separate marked output leads used to select the required line location and ringing code.

Our invention is a number translator wherein a translating means translates a directory number, represented by a plurality of input leads, into a first electrically marked lead. This first lead is crossconnected to a gating means which prepares the operate paths of a group of line locations containing the required line location. The directory number is translated by the translating means into a second electrically marked lead crossconnected to a first selecting means to select the required line location from the group of line locations. A second selecting means, responsive to the translating means, selects the ringing code.

In our preferred embodiment of the invention, the directory number, each digit of which is represented by one electrically marked input lead out of a group of ten leads, is translated by a crossbar switch. In this switch, a select magnet operates in response to the marked input lead representing the tens digit and a hold magnet operates in response to the marked input lead representing the hundreds digit, thereby closing a cross point of the switch. Closure of the crosspoint extends the ten units input leads, and the electrical mark on one of the units input leads is thereby connected via a first electrically marked lead to a first terminal. The gating means is a first relay crossconnected to the first terminal which prepares the operate paths of the group of line locations containing the required line location. The first relay also connects an electrical mark to a serially connected circuit consisting of a contact of a unit relay slaved to the electrically marked unit input lead, a contact of a tens block relay slaved to the closed crosspoint, and via the second electrically marked lead to a second terminal. The second terminal is crossconnected to the first selecting means which is a second realy that applies an electrical mark to the required line location operate path prepared by the first relay. Thus, the required line location is selected. The second selecting means is a third relay: an auxiliary relay, slaved to the second relay, connects the third relay to the second terminal in place of the second relay; operation of the third relay in response to the electrical mark on the second terminal selects the ringing code by connecting an electrical mark to leads going to a ringing circuit external to the number translator.

Our preferred embodiment utilizes a crossbar switch to extend ten unit leads, as does the noted Vroom patent in a similar manner; however, from hereon, we achieve an economy in using a circuit designed for standard relays slaved to the closed crosspoint and marked unit input lead and spare switch contacts, in place of special equipment, to obtain several marked leads for line location and ringing selection.

The invention will be clearly understood by reference to the drawings.

Figures 5, 7:
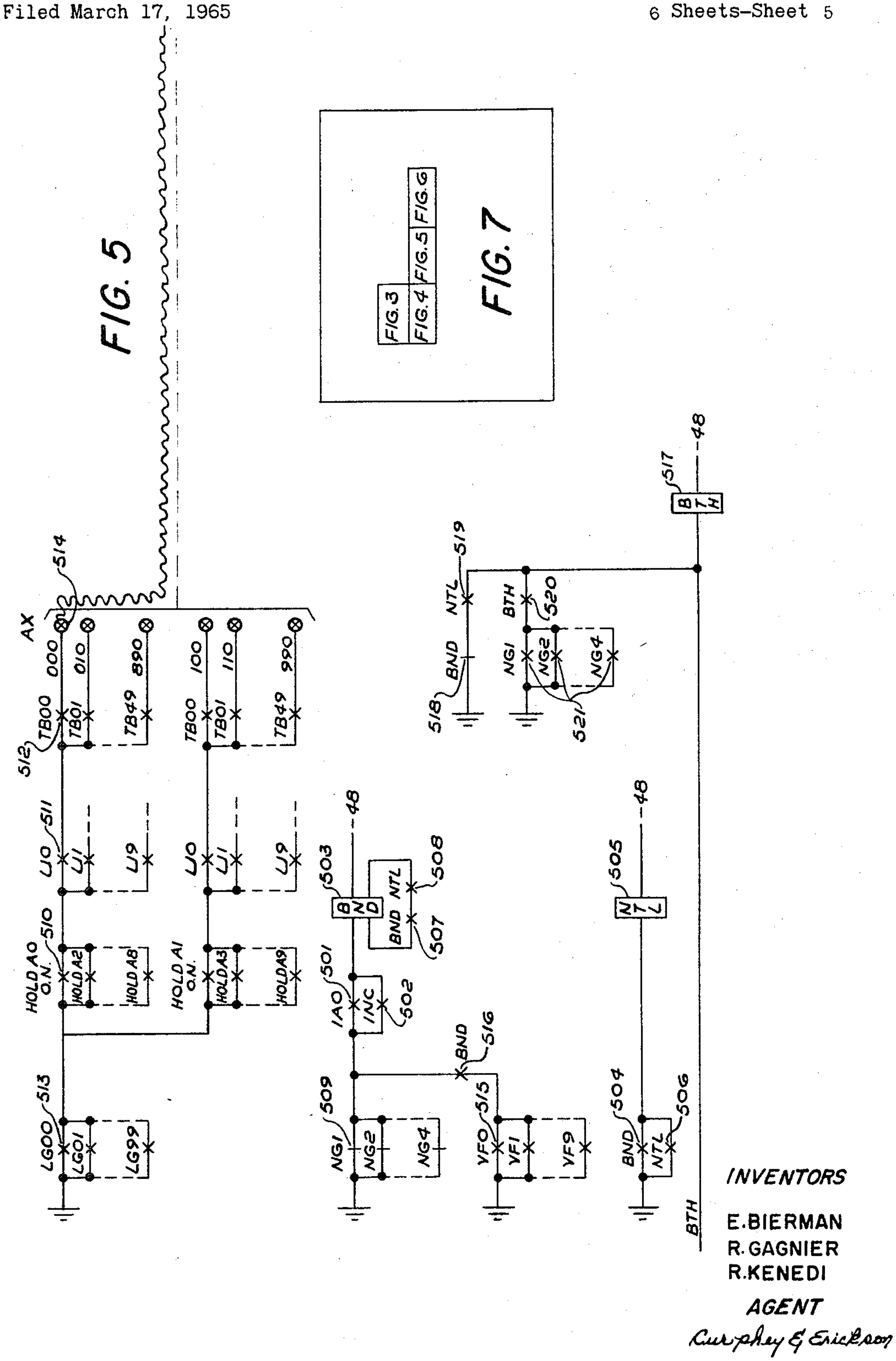
Figure 6:
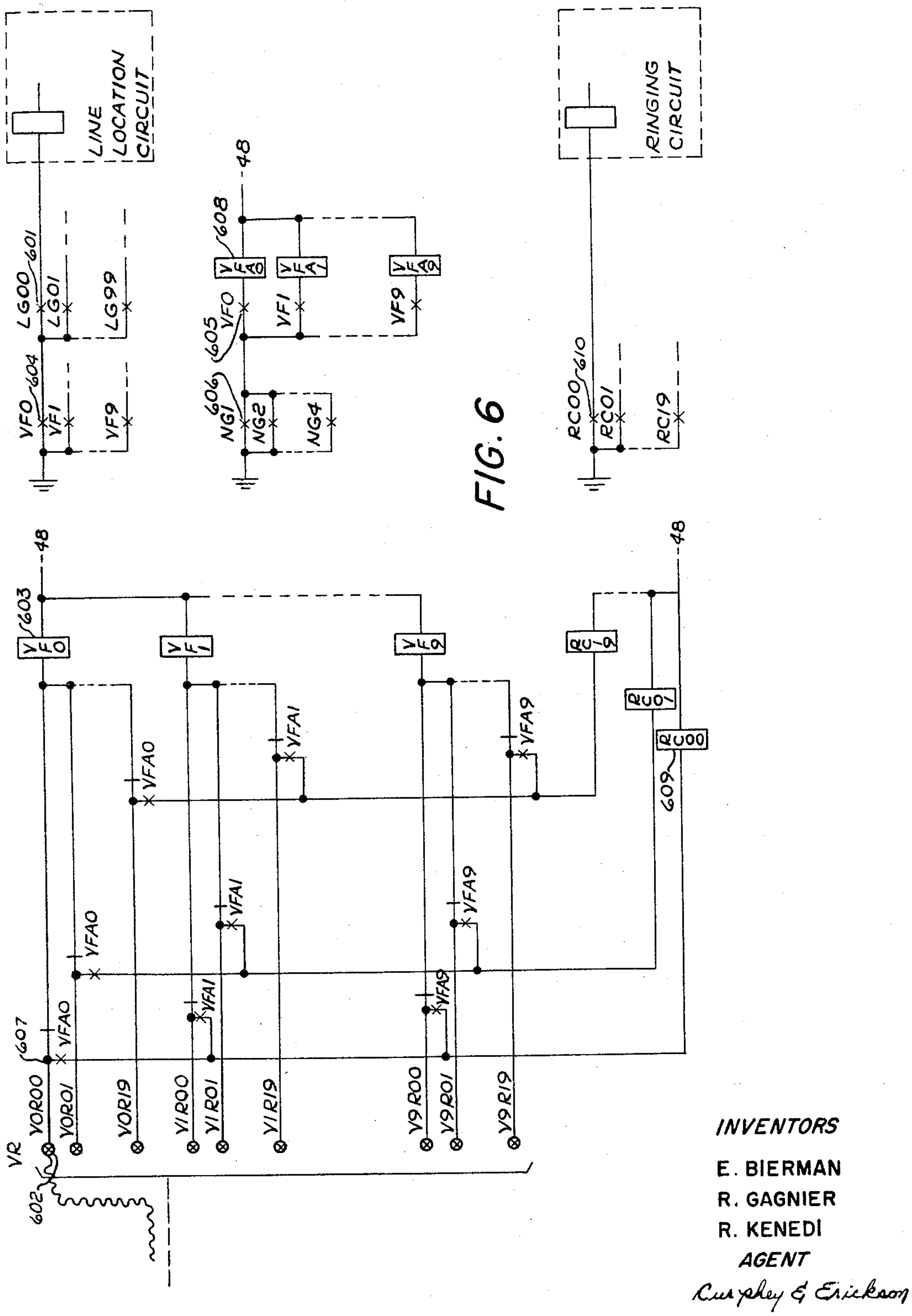

FIGS. 3 to 6, inclusive, form the detailed circuit of our preferred embodiment,

FIG. 7 shows the alignment of FIGS. 3, 4, 5 and 6.

Figure 1:
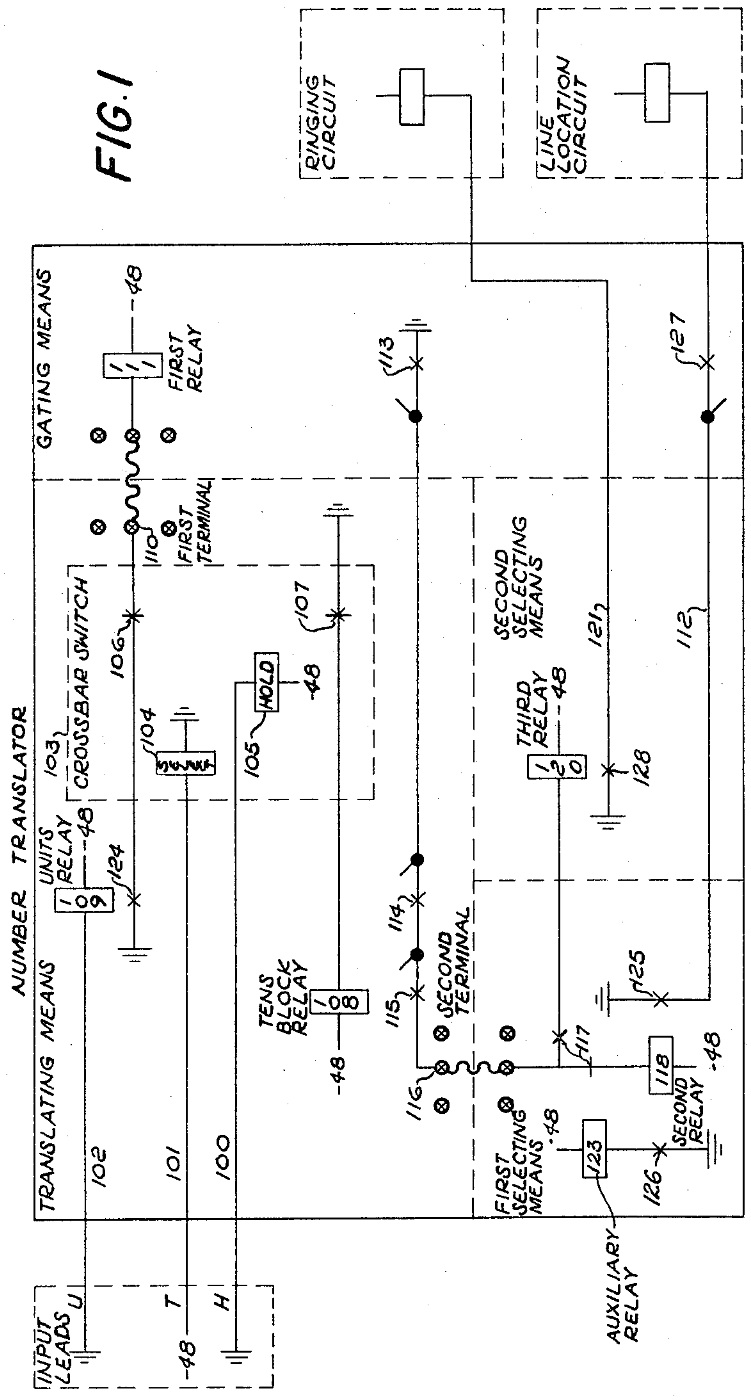
FIG. 1 shows our preferred embodiment in a schematic form.

Referring to FIG. 1, this shows schematically our preferred embodiment of the invention being a number translator for one thousand directory numbers. Each digit of the directory number is represented by one electrically marked input lead in a group of ten input leads. Three such marked input leads are shown at 100, 101 and 102 representing the hundreds, tens and units digits respectively. The translating means, a crossbar switch 103, is arranged so that a select magnet 104 operates in response to the marked tens digit lead 101, and a hold magnet 105 operates in response to the marked hundreds digit lead 100, thereby closing a crosspoint of the switch to operate eleven contacts, two contacts being shown at 106 and 107. Closure of the crosspoint extends ten units leads, one of which, marked with ground through the make contact 124 of the units relay 109 in response to the marked units input lead 102, is shown extended by contact 106. Thus, a first terminal 110 representing the directory number is electrically marked with ground.

The gating means comprises first relays, one of which 111 is crossconnected to the first terminal 110 and operates to prepare the operate paths of ten line locations. One such operate path is shown at 112, prepared by make contact 127 of the first relay 111. The first relay 111 also connects ground through its contact 113 to a serially connected circuit consisting of a contact 114 of the units relay 109, a contact 115 of a tens block relay 108 slaved to the operated crosspoint contact 107, to electrically mark a second terminal 116 with ground.

The first selecting means comprises second relays, one of which 118 is crossconnected to the electrically marked second terminal 116. The required line location is selected by the second relay 118 connecting ground by its contact 125 to the operate path 112 prepared previously. An auxiliary relay 123 operates in response to the operated contact 126 of the second relay 118.

The second selecting means comprises third relays; one third relay 120 operates in response to the electrical mark on the second terminal 116, through the operated transfer contact 117 of the auxiliary relay 123, to select the ringing code by connecting ground through its contact 128 to lead 121 going to an external ringing circuit.

Certain variations may be devised by those skilled in the art and following are two possible variations. Some large common control switching systems require two marked leads to prepare the operate paths of a plurality of line locations: our invention may be adapted to mark two leads by adding second auxiliary relays, each responsive to a first relay, connected similarly to the auxiliary relay 123. The second auxiliary relay transfers the electrical mark on the first terminal, from the first relay to a fourth relay: the fourth relay in operating marks the second lead required to prepare the operate paths of a plurality of line locations.

It may be more convenient, in connecting the input leads to the crossbar switch, to alter the function of each group of leads: for example, the units leads may be connected to the select magnets, the tens leads to the hold magnets and the hundreds leads may be extended by closure of the crosspoint. Any permutation of input leads may be connected to the select magnets, hold magnets or extended through the crosspoint, to electrically mark a first terminal.

Figure 2:
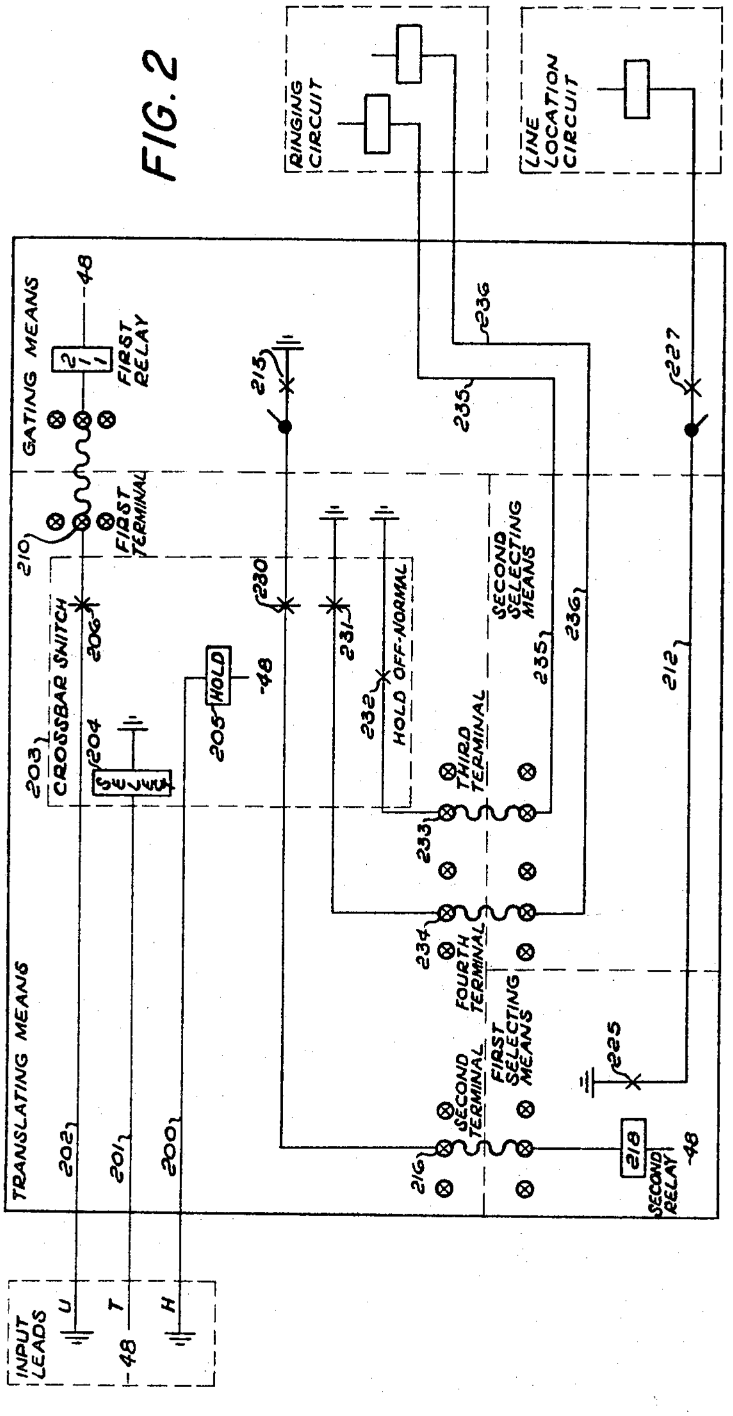
FIG. 2 shows a second embodiment also in schematic form.
Figure 3:
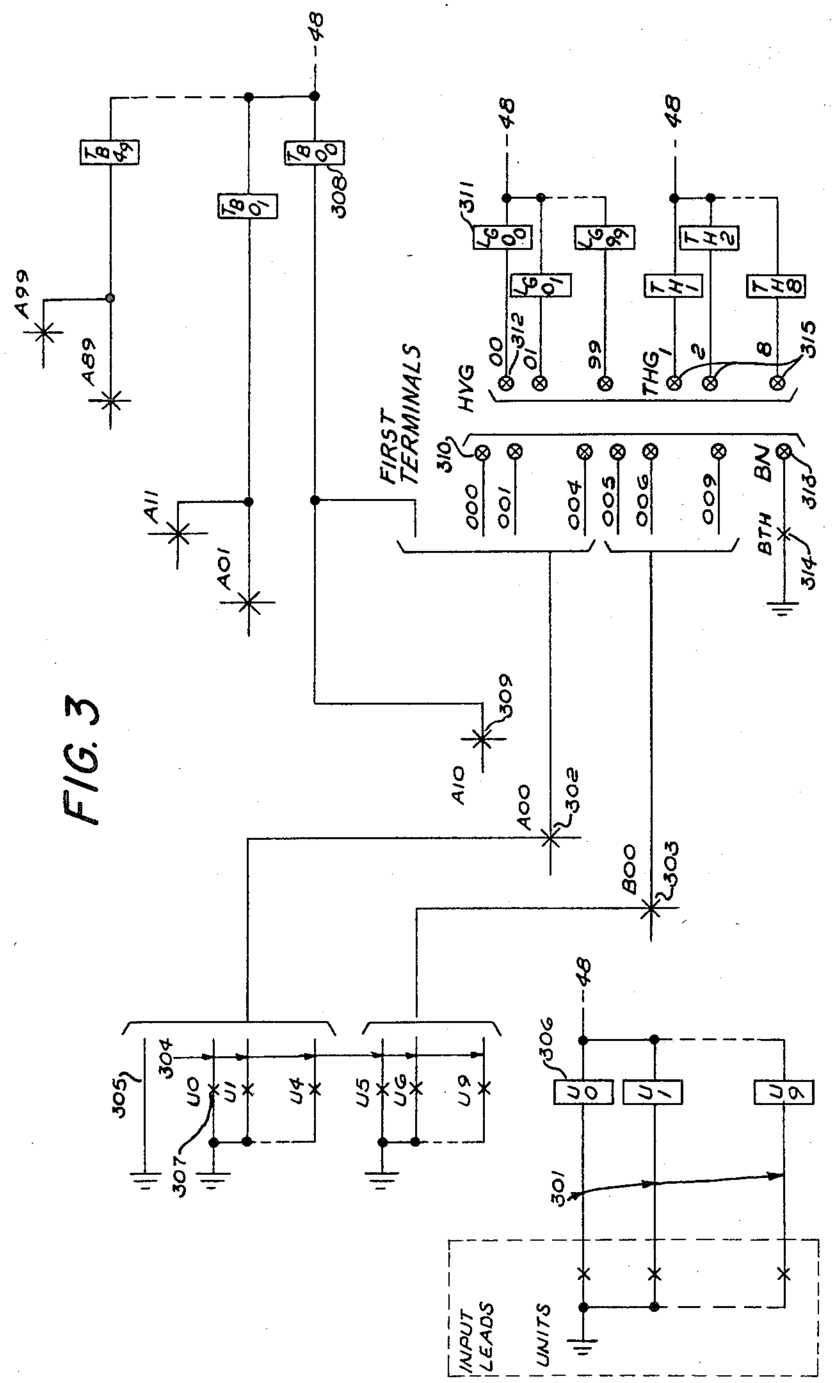
Figure 4:
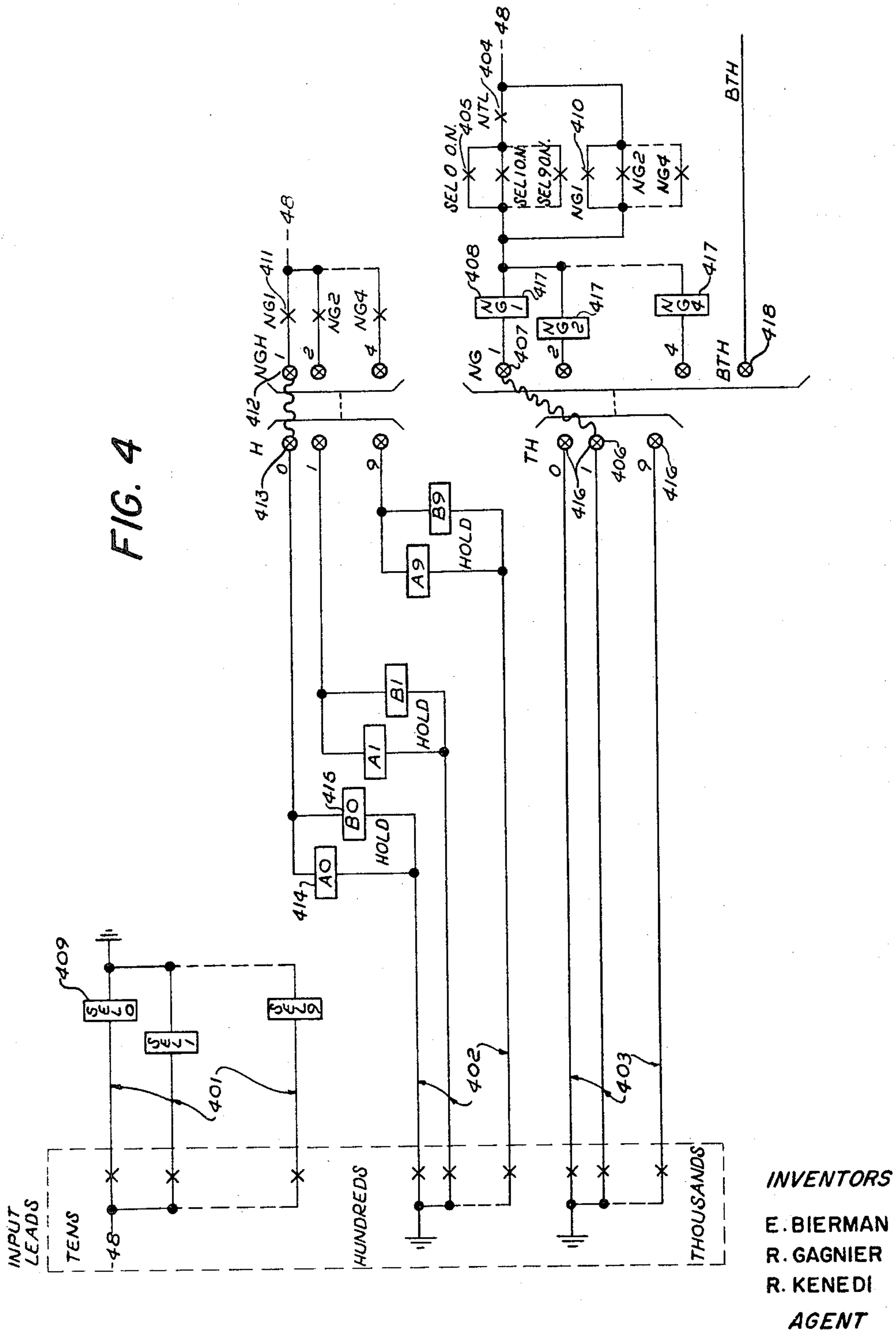

Referring now to FIG. 2, this shows schematically a second, simpler, and less expensive embodiment of our invention: however, it does not permit free assignment of line locations, or ringing codes, to directory numbers.

In operation, a crosspoint is closed in exactly the same manner as already described in reference to FIG. 1. The group of units input leads are extended by closure of the crosspoint whereby the electrically marked units input lead 202 is connected through the crosspoint contact 206 to the first terminal 210.

The first relay 211 is operated in the same way as 111 in FIG. 1 to prepare the operate paths of ten line locations, one operate path being shown at 212.

The first relay 211 also operates its contact 213 to connect ground to the operated make contact 230 of the crosspoint which is serially connected between the gating means and the second terminal 216. A hold magnet off normal make contact 232 is arranged to electrically mark a third terminal 233 with ground. Another operated make contact 231 of the crosspoint is arranged to connect ground to electrically mark a fourth terminal 234.

A first selecting means comprising a second relay 218, having its energizing circuit crossconnected to the second terminal 216, is arranged to select by closure of its make contact 225, the required line location from the group of line locations over the operate path 212 prepared by the first relay 211.

A second selecting means, comprising a third lead 235 electrically marked by crossconnection to the ground on the third terminal 233, and a fourth lead 236 electrically marked by crossconnection to the ground on the fourth terminal 234, is arranged to select the ringing code through the combination of the third 235 and fourth 236 leads in a circuit external to the number translator.

As noted previously, this our second embodiment does not permit free assignment of line locations or ringing codes to directory numbers. It will be recalled that the crosspoint of the switch is operated by a combination of the hundreds and tens digits; therefore the crosspoint is representative of ten consecutive numbers. Thus, all ten numbers will operate the same second relay and different line locations can only be selected by assignment of a different first relay to each directory number.

In a working system, the third terminal crossconnection is used to determine to which conductor of the telephone line that the ringing current is applied. The ringing code itself is determined by the fourth terminal crossconnection. Now by reference to FIG. 2, it will be seen that ten consecutive numbers represented by a crosspoint can have only one ringing code assigned to all ten numbers because the crosspoint always connects ground to the same fourth terminal. It will be seen from FIG. 2 that a hold magnet off-normal contact is used to mark a third terminal. Since the hundreds digit operates the hold magnet, one hundred consecutive numbers will have ringing assigned to the same conductor of the telephone line.

Thus, we have demonstrated the restrictions incurred in our simpler second embodiment.

We will now describe the operation in detail of our preferred embodiment of the invention which is a number translator to translate one out of a thousand directory numbers into a line location and ringing code. In this description, the directory number 1000 will be used to explain the operation of the number translator. In referring to the drawings, it will be understood that the first digit of the reference numbers indicates the figure wherein the reference will be found.

The number translator is called into use by a digit register circuit external to the number translator. The digit register distinguishes between intraoffice and incoming calls and operates the make contact 501 or 502 respectively, to energize the blank number detect (BND) relay 503. A make contact 504 of the BND relay operates the number translation (NTL) relay 505 which locks to itself over contact 506. The BND and NTL relays being operated short circuit (contacts 507 and 508 respectively) the secondary winding of the BND relay 503 causing it to have a slow release characteristic.

Each digit of the directory number is represented by an electrical mark on one input lead out of a group of ten input leads coming from an external circuit for example, a conventional register; there being four groups of input leads, 301, 401, 402 and 403 representing the units, tens, hundreds and thousands digits respectively. Translating means are energized, responsive to each marked input lead, to translate the directory number into a first single electrically marked lead. The translating means is a standard 200 point, 6 wire, crossbar switch. A select magnet of the switch is arranged to operate in response to the marked input lead representing the tens digit; thus select magnet 0, 409, operates on application of battery.

Operation of the NTL relay 505 closed its make contact 404; operation of select magnet 0 closes its off-normal make contact 405. The thousands marked input lead appears at the thousands (TH) crossconnection terminal 1, shown at 406, and is crossconnected to the number group (NG) crossconnection terminal 1, shown at 407. Number group relay 1 (NG1), 408, operating in response to the marked thousands input lead, closes its make contact 410 to provide a parallel holding path for itself and removes the holding ground from the blank number detect (BND) relay 503 by operation of break contact 509. Thus, the BND relay 503 will release after a time determined by its short circuited secondary winding unless another holding ground is substituted to show that the number translation is proceeding normally. Operation of NG1 also closes make contact 411 to prepare the operating path for the hold magnets over a crossconnection from the number group hundreds (NGH) crossconnection terminal 1, 412, to the hundreds (H) crossconnection terminal 0, 413.

A hold magnet of the switch is arranged to operate in response to the marked hundreds input lead: in this embodiment, we use two crosspoints operating together to obtain 12 make contacts for each translation rather than use a non-standard switch with 12 contacts per crosspoint: therefore, ground on the hundreds input lead 402 representing zero hundred operates hold magnets A0 and B0 shown at 414 and 415 respectively, thereby closing two crosspoints of the switch, A00 and B00 at 302 and 303 respectively. The ten units leads 304 are thus extended by closure of the crosspoints 302 and 303 to the first terminals (X). Note that the marked units input lead 301 operated the units relay zero (U0) 306 slaved to it, closing a contact 307 to ground one of the units leads 304 and so electrically mark the first terminal 000 shown at 310. Operation of U0 also closes a contact 511 which forms part of a relay tree. Closure of the crosspoint A00, 302, extends a ground 305 to operate the tens block relay (TB00) 308 representing the operated crosspoint A00, 302, and also the non-operated crosspoint A10, 309. Operation of TB00 closes the make contact 512 in the relay tree. Note that one tens block (TB) relay represents one crosspoint in an even hundred, and, one crosspoint in an odd hundred. This will be referred to later in this description. In operating, the hold magnet A0, 414, also closes an off-normal (O.N.) make contact 510 in the relay tree.

A gating means is crossconnected to the first terminal 310 and is arranged to operate in response to the ground on the terminal to prepare the operate path of the group of line locations containing the required line location. The required line location is found amongst equipment external to this circuit with two bits of information: i.e., the line group of ten line locations, one of which is the required line location, and the vertical file within the line group which is the required line location. We will assign the directory number 1000 to line group 00 and vertical file (VF) 0 for the purpose of this description. We shall also assign the ringing code (RC) to be code 00.

The gating means is a first relay shown as line group gate (LG) 00, 311, having its energizing circuit crossconnected to the first terminal 310, via the horizontal and vertical group (HVG) crossconnection terminal 00, 312, and a crossconnecting jumper wire. The LG00 relay 311 is arranged to prepare the operate paths of the group of line locations by closing ten make contacts as shown at 601, and to connect 513 ground to the relay tree composed of the serially connected hold magnet off-normal make contact 510, the U0 relay make contact 511 and the TB00 relay make contact 512. Previously, it was explained that the TB00 relay 308 represented two crosspoints; now, in the relay tree just described, the operated crosspoint information is extracted with the addition of the hold off-normal contact 510 to determine whether the odd or even crosspoint associated with the TB00 relay is operated.

The translating means is arranged, in response to the ground 513 connected by the gating means, to translate the directory number into a second single electrically marked lead appearing at a second terminal 514 representing the directory number. This operation is accomplished with the relay tree already described comprising contacts 513, 510, 511 and 512.

A first selecting means, cross connected to the marked second terminal 514, is arranged to select the required line location from the group of line locations. The first selecting means is a second relay 603 shown as vertical file (VF) relay 0, and it is crossconnected, through the vertical file and ringing code (VR) terminal 602, and a crossconnecting wire, to the ground appearing on the second terminal 514. The VF0 relay 603 connects ground 604 to select the required line location over the path 601 prepared by the LG00 relay 311. The VF0 relay 603 operates its auxiliary relay (VFA) 0, 608, over the make contact 605 and the already operated contact 606 of the NG1 relay 408.

Referring to the timing period started by removal of the holding ground 509 from the BND relay 503, the VF0 relay substitutes a new holding ground to keep the BND relay operated over contact 515 and the operated BND contact 516.

The directory number has at this stage been translated into the required line location but it still remains to translate the directory number into the ringing code. This is done with a second selecting means which comprises a third relay having its energizing circuit connected, through the transfer contact 607 of VFA0 relay 608, to the ground on the second terminal 514. The third relay, the RC00 relay 609, selects the ringing code by grounding a lead 610 representing the ringing code which is connected to a circuit external to the number translator.

The VF0 relay should remain operated long enough to ensure operation of the relays in the line location and ringing circuits. As will be readily understood by those skilled in the art, this can be accomplished either by making the VF0 relay slow-to-release or by providing a holding path through one of its own contacts.

From a telephone company's point of view, it is desirable that the number translator although arranged to translate one thousand only directory numbers, should be able to handle directory numbers in more than one "thousands" group. One standardized numbering plan requires a four digit number to be assigned to each station—therefore, the number translator must be able to handle ten "thousands" groups, even if only to provide interception for nine unused "thousand" groups. It may also be convenient for administrative reasons to allocate individual and 2-party stations to a "thousand" group, multi-party stations to another "thousand" group and coin box stations to yet another "thousand" group.

Our number translator is arranged so that up to four "thousand" digits may be translated as working station "thousands" by crossconnection of a thousand (TH) terminal 416 to one of four number group (NG) terminals 417. Ground from the marked thousand lead will operate a number group (NG) relay which in turn gates particular "hundred" groups by one or more crossconnections from the respective NGH terminal to the H terminals. The unused "thousands" are intercepted by crossconnection of the respective TH terminal to the blank thousand (BTH) terminal 418: ground from the marked thousand input lead will operate the blank thousand (BTH) relay 517, which grounds the blank number (BN) terminal 313 through its make contact 314. The BN terminal is crossconnected to a terminal hunting group (THG) terminal 315 to operate a terminal hunting group (TH) relay. The TH relay energizes an external circuit to intercept the call by operator, machine announcement or busy tone as required. Unused or disconnected numbers in a "working thousand" group may be intercepted by a crossconnection from the respective X terminal to one of the THG terminals.

The BTH relay 517 may be operated by failure of the number translator to complete a number translation that has been started. Such a failure would occur if translation of a number not assigned to any subscriber is being attempted. In this case the BND relay 503 will be deenergized by failure of a VF relay to supply a holding ground, as described before. Thus, the break contact 518 of the BND relay is released, the NTL relay make contact 519 remains operated and ground is applied to operate the BTH relay 517. A circuit to ground comprising the BTH relay make contact 520 and a NG relay make contact 521 holds the BTH relay operated.

Where several "equivalent" lines are required, the one listed directory number is dialled: the X terminal representing the number is crossconnected to a THG terminal representing the group of "equivalent" numbers. This operates the corresponding TH relay to energize an external circuit to hunt for an idle line in the group and select the line location and ringing code.

What is claimed is:

1. A number translator to convert a directory number represented by a plurality of input leads, where each digit of a said number is represented by one electrically marked input lead out of a group of input leads, into a line location and a ringing code, comprising:

(a) translating means arranged to be responsive to each marked input lead to translate said number into a first single electrically marked lead appearing at a first terminal representing said number;
(b) gating means crossconnected to said terminal and arranged to operate in response to said marked lead to prepare the operate path of the group of line locations containing the required line location;
(c) the translating means being arranged to translate said number into a second single electrically marked lead appearing at a second terminal representing said number;
(d) first selecting means cross-connected to said second terminal and arranged to select the required line location from the group of line locations;
(e) and second selecting means, responsive to the translating means, to select the ringing code.

2. A number translator as defined in claim 1, wherein the translating means comprises:

(a) a crossbar switch;
(b) a select magnet of the switch being arranged to operate in response to the marked input lead representing the tens digit;
(c) a hold magnet of the switch being arranged to operate in response to the marked input lead representing the hundreds digit, thereby closing a crosspoint of the switch;
(d) the group of units input leads being extended by closure of the crosspoint whereby the electrically marked units lead is connected to the first terminal;
(e) a plurality of tens block relays, each crosspoint having a tens block relay slaved to the operation of the crosspoint;
(f) a plurality of units relays, each units input lead having a units relay slaved to it;
(g) a make contact of the operated units relay and a make contact of the operated tens block relay, serially connected between the gating means and the second terminal.

3. A number translator as defined in claim 1, wherein the translating means comprises:

(a) a crossbar switch;
(b) a select magnet of the switch being arranged to operate in response to the marked input lead representing the tens digit;
(c) a hold magnet of the switch being arranged to operate in response to the marked input lead representing the hundreds digit, thereby closing a crosspoint of the switch;
(d) the group of units input leads being extended by closure of the crosspoint whereby the electrically marked units lead is connected to the first terminal;
(e) a make contact of the crosspoint serially connected between the gating means and the second terminal;
(f) a hold magnet make off-normal contact being arranged to electrically mark a third terminal, and
(g) a make contact of the crosspoint being arranged to electrically mark a fourth terminal.

4. A number translator as defined in claim 2 wherein the gating means comprises a first relay, having its energizing circuit cross-connected to the first terminal and being arranged to prepare the operate paths of the group of line locations, the relay being arranged to connect an electrical mark through one of its make contacts to the serially connected units and tens block relay make contacts.

5. A number translator as defined in claim 4 wherein the first selecting means comprises a second relay having its energizing circuit crossconnected to the second terminal and being arranged, through one of its make contacts, to select the required line location from the group of line locations over one of the operate paths prepared by the first relay.

6. A number translator as defined in claim 5 wherein the second selecting means comprises a third relay having its energizing circuit crossconnected through a contact of an auxiliary relay, slaved to the second relay, to the second terminal and being arranged to select the ringing code.

7. A number translator as defined in claim 3 wherein the gating means comprises a first relay, having its energizing circuit crossconnected to the first terminal and being arranged to prepare the operate paths of the group of line locations, the relay being arranged to connect an electrical mark to the make contact of the crosspoint serially connected to the second terminal.

8. A number translator as defined in claim 7 wherein the first selecting means comprises a second relay having its energizing circuit crossconnected to the second terminal and being arranged, through one of its make contacts, to select the required line location from the group of line locations over one of the operate paths prepared by the first relay.

9. A number translator as defined in claim 8 wherein the second selecting means comprises:

(a) a third lead, electrically marked by crossconnection to the third terminal;
(b) a fourth lead, electrically marked by connection to the fourth terminal, the third and fourth marked leads being arranged, in combination, to select the ringing code.

No references cited.

KATHLEEN H. CLAFFY, *Primary Examiner.*
LAURENCE A. WRIGHT, *Assistant Examiner.*